United States Patent
Ha et al.

(10) Patent No.: US 11,348,327 B1
(45) Date of Patent: May 31, 2022

(54) METHOD AND SYSTEM FOR ARRANGING AND MANIPULATING TO AUGMENTED REALITY CONTENTS IN 3D SPACE

(71) Applicant: VIRNECT inc., Seoul (KR)

(72) Inventors: Tae Jin Ha, Gimpo-si (KR); Soo Hwan Kim, Seoul (KR)

(73) Assignee: VIRNECT INC., Seoul (KR)

( * ) Notice: Subject to any disclaimer, the term of this patent is extended or adjusted under 35 U.S.C. 154(b) by 0 days.

(21) Appl. No.: 17/565,316

(22) Filed: Dec. 29, 2021

(30) Foreign Application Priority Data

Dec. 30, 2020 (KR) .................... 10-2020-0187727

(51) Int. Cl.
| | |
|---|---|
| G06T 19/00 | (2011.01) |
| G06T 19/20 | (2011.01) |
| G06F 3/01 | (2006.01) |
| G06F 3/04815 | (2022.01) |

(52) U.S. Cl.
CPC .............. *G06T 19/20* (2013.01); *G06F 3/015* (2013.01); *G06F 3/04815* (2013.01); *G06T 19/006* (2013.01); *G06T 2219/2004* (2013.01); *G06T 2219/2016* (2013.01)

(58) Field of Classification Search
CPC .............. G06T 19/20; G06T 2219/2016; G06T 2219/2004; G06T 19/006; G06F 3/04815; G06F 3/015
See application file for complete search history.

(56) References Cited

FOREIGN PATENT DOCUMENTS

| KR | 101723828 B1 | 4/2017 |
| KR | 101733681 B1 | 5/2017 |
| KR | 20190132191 A | 11/2019 |
| KR | 102058458 B1 | 12/2019 |
| KR | 20200001237 A | 1/2020 |

OTHER PUBLICATIONS

Creed et al., "Head Mounted Display Interaction Evaluation: Manipulating Virtual Objects in Augmented Reality", IFIP, 2019. (Year: 2019).*

* cited by examiner

*Primary Examiner* — Nicholas R Wilson
(74) *Attorney, Agent, or Firm* — STIP Law Group, LLC

(57) ABSTRACT

A method for arranging and manipulating augmented reality (AR) content in the 3D space according to an embodiment of the present disclosure, performed by a creation application executed by at least one or more processors of a mobile terminal, comprises detecting a 3D arrangement space which is a 3D space representing a surrounding environment; displaying AR content on the detected 3D arrangement space; providing an attribute information edit interface through which position information of the displayed AR content is modified according to a user input; modifying position information of the AR content based on a user's gesture input through the provided attribute information edit interface; reconfiguring the modified position information as the position information of the AR content; and storing the reconfigured AR content.

3 Claims, 8 Drawing Sheets

[FIG. 1]
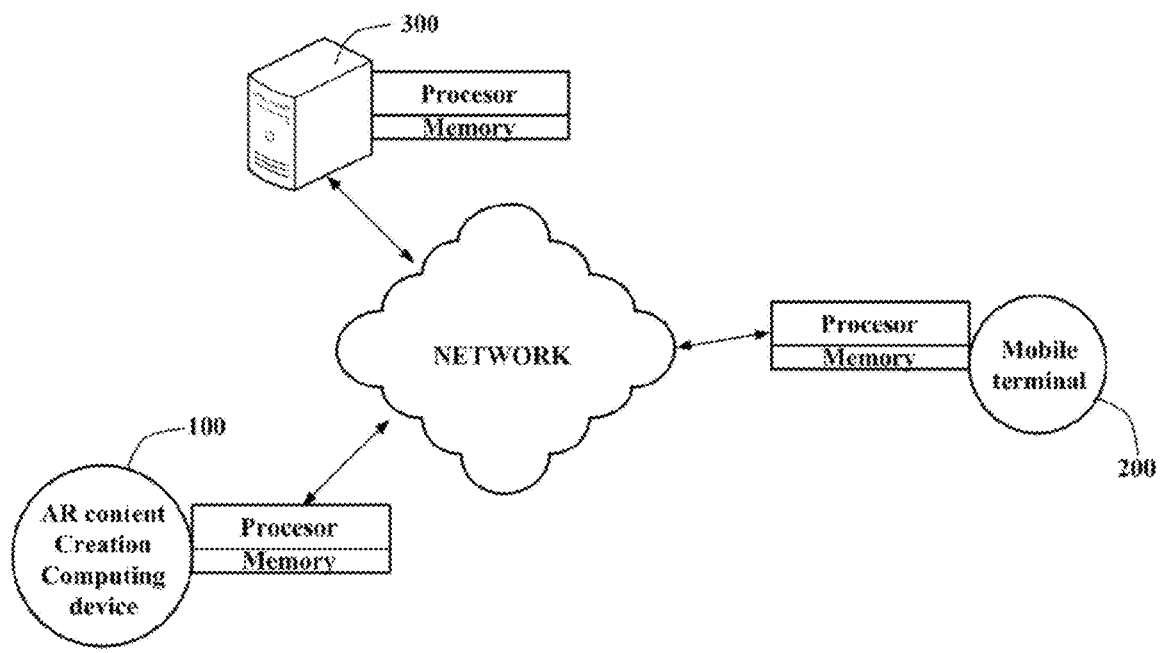

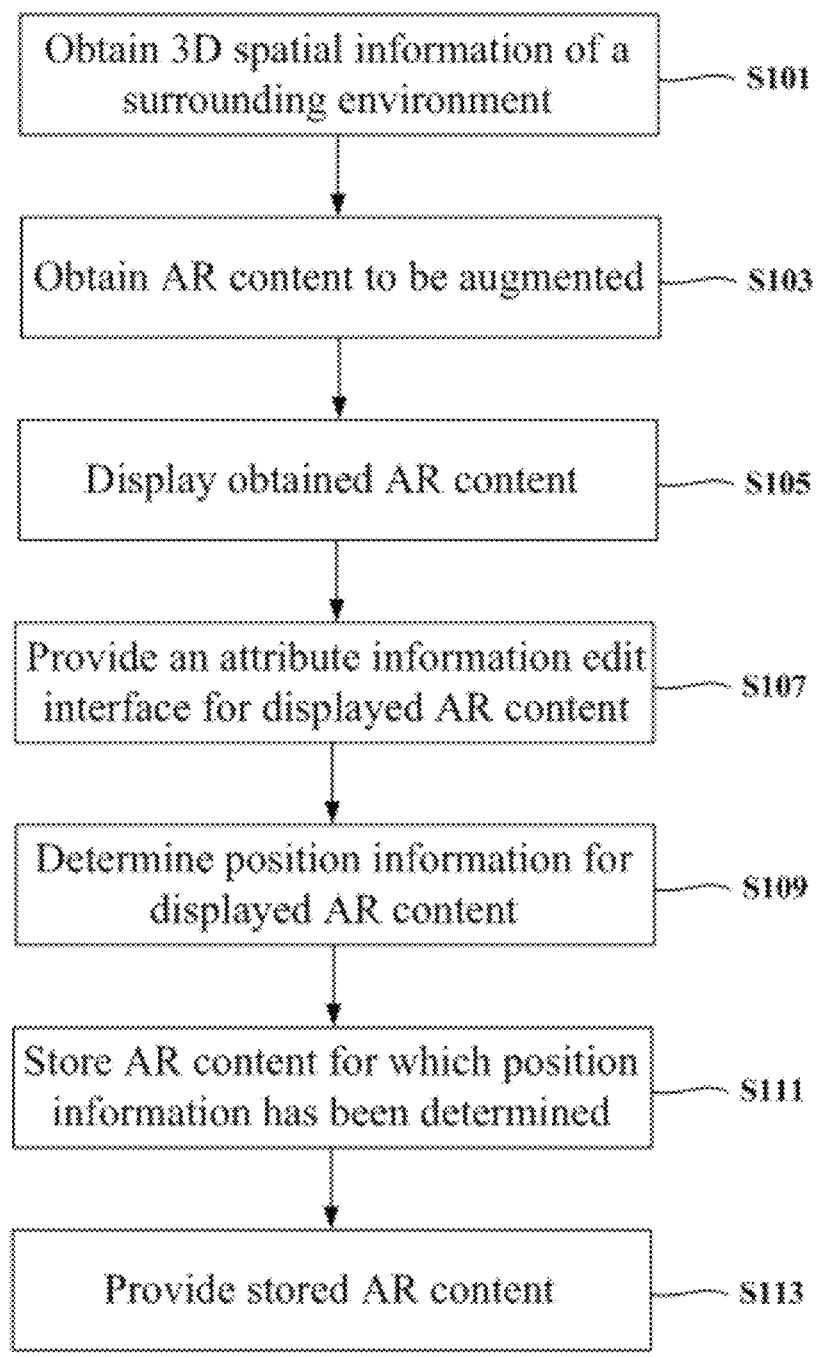
[FIG. 2]

[FIG. 3]
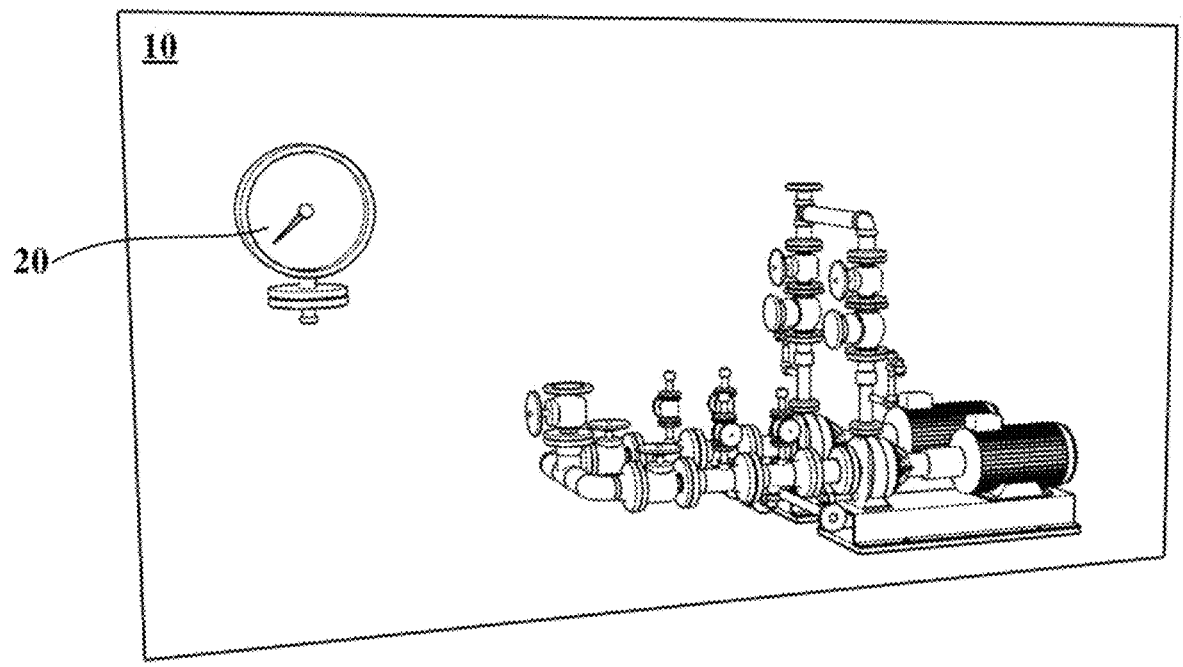

[FIG. 4]
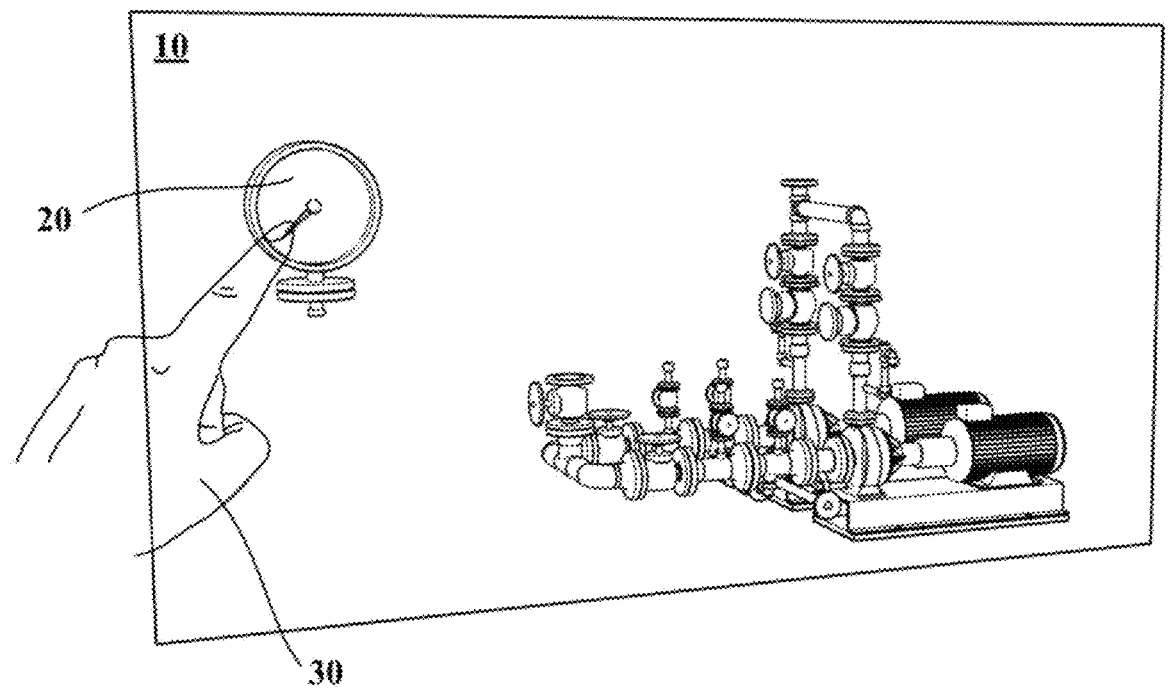

[FIG. 5]
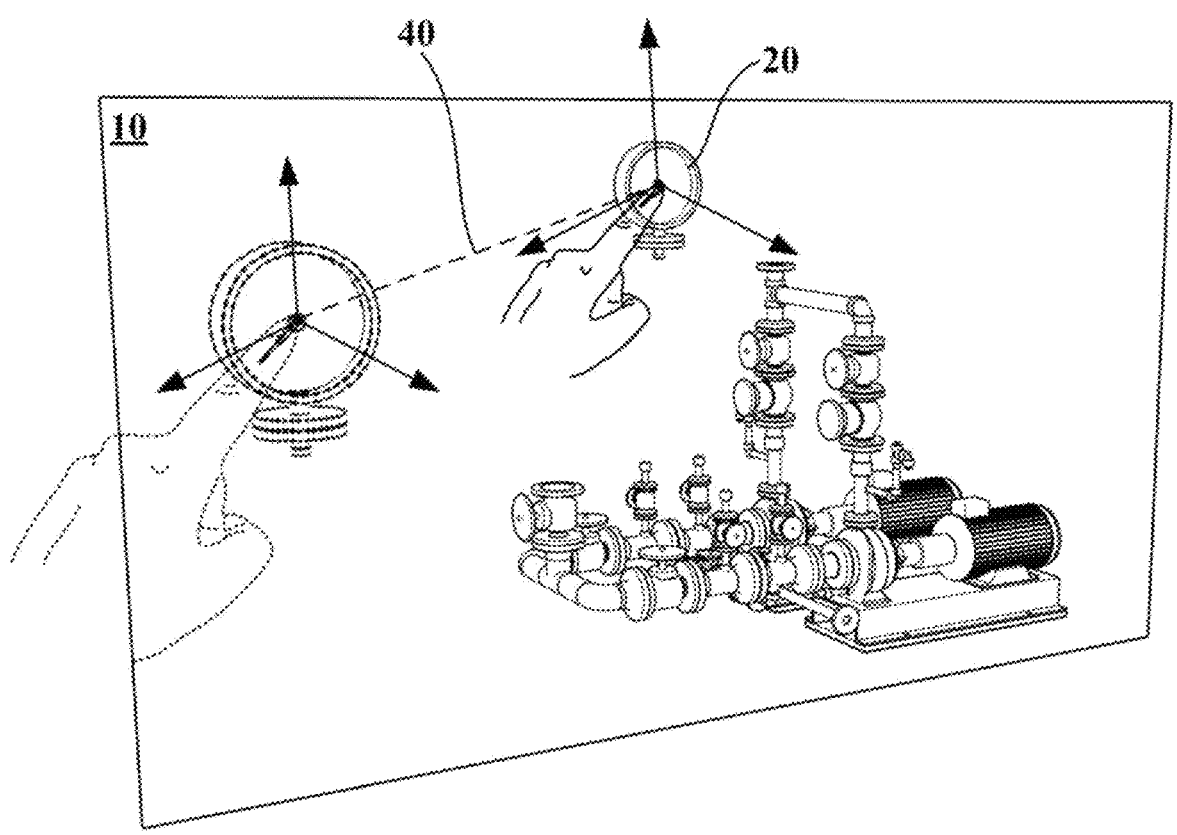

[FIG. 6]
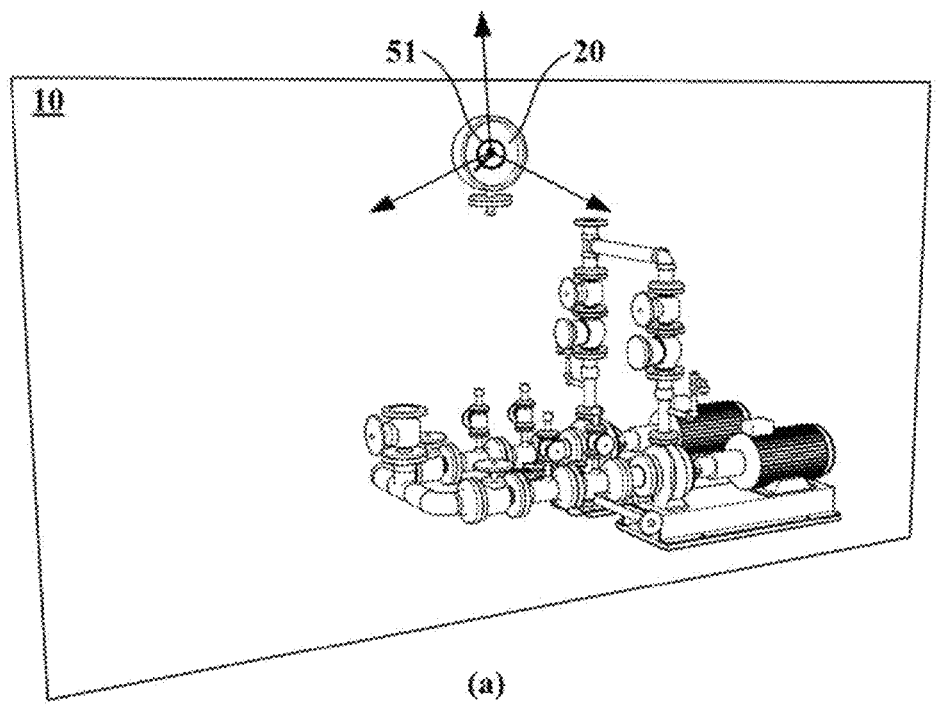
(a)
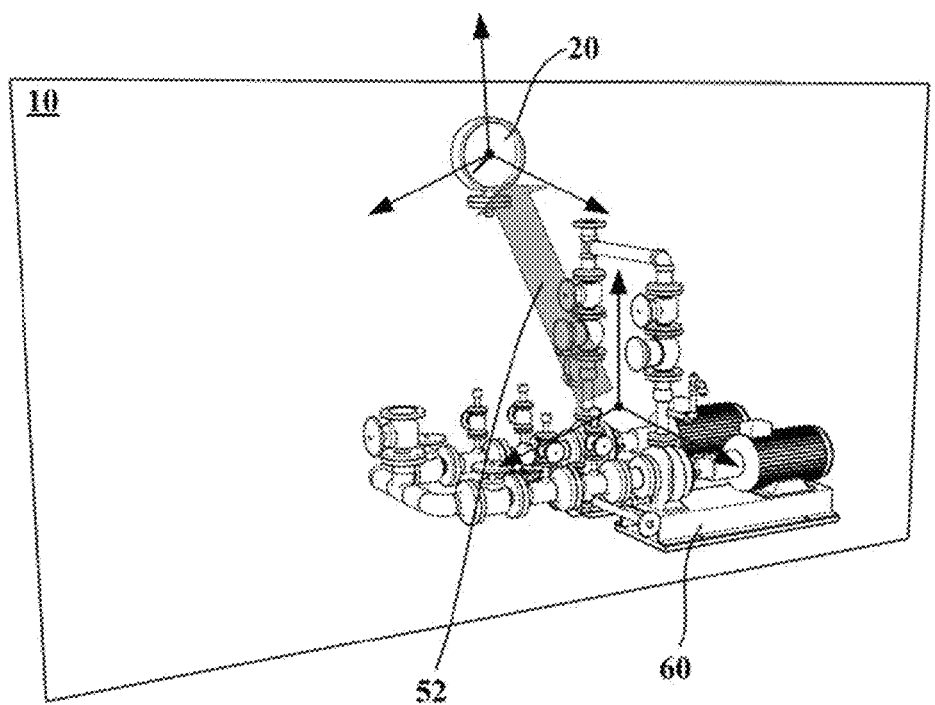

[FIG. 7]
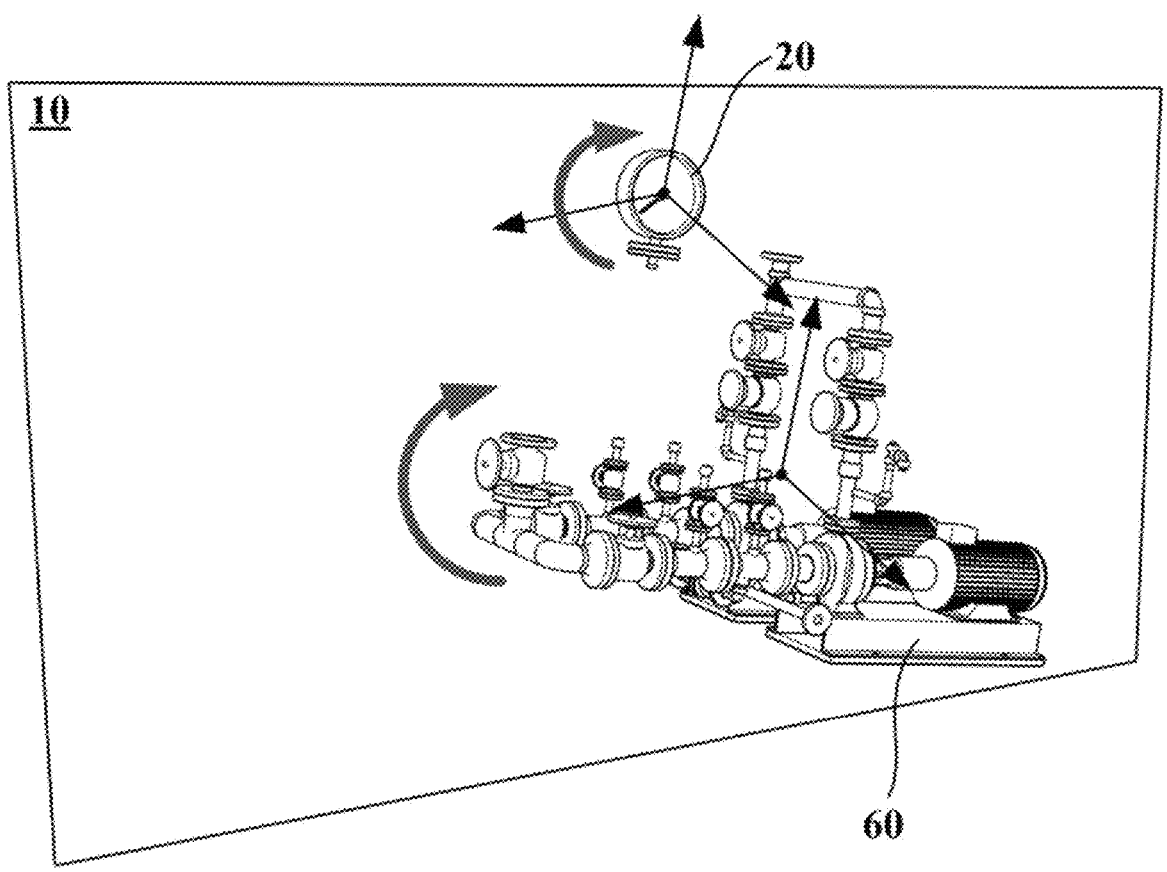

[FIG. 8]
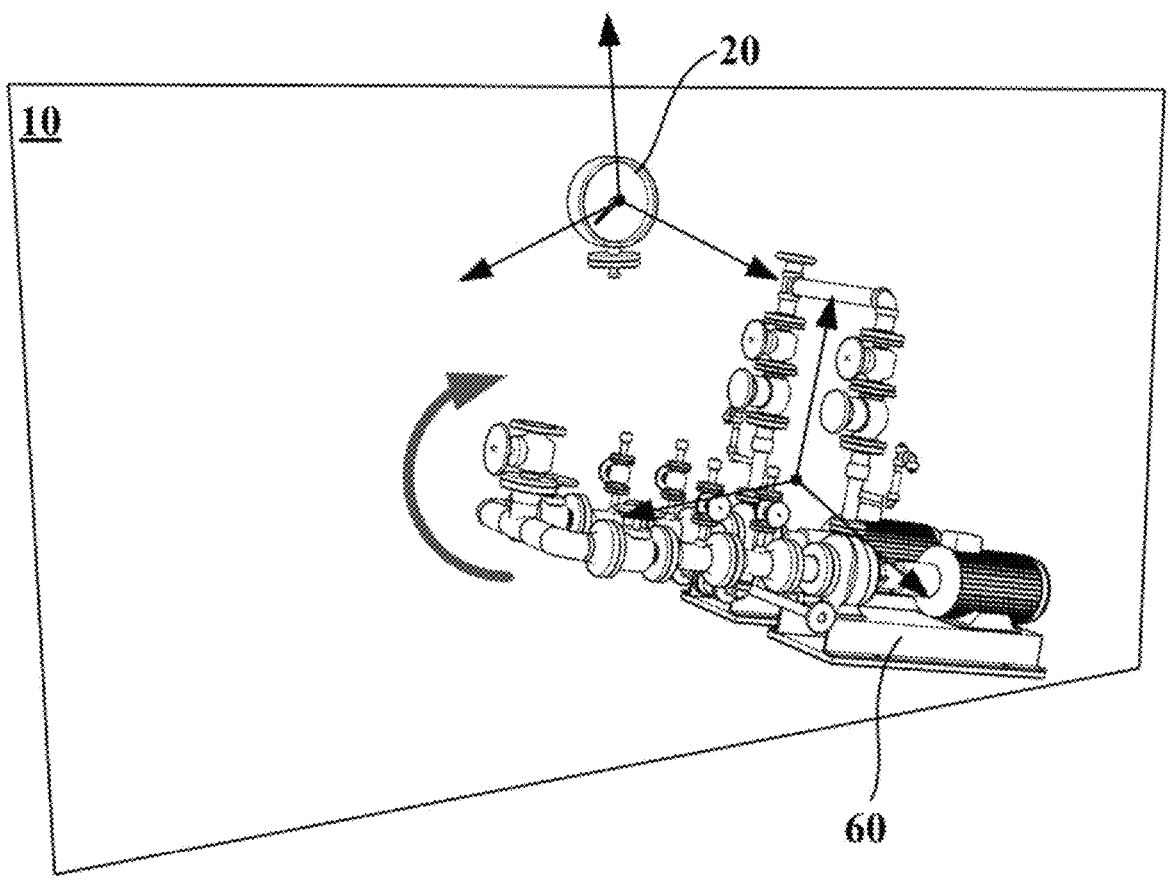

METHOD AND SYSTEM FOR ARRANGING AND MANIPULATING TO AUGMENTED REALITY CONTENTS IN 3D SPACE

CROSS-REFERENCE TO RELATED APPLICATIONS

This application claims the priority of the Korean Patent Applications NO 10-2020-0187727 filed on Dec. 30, 2020, in the Korean Intellectual Property Office, the disclosure of which is incorporated herein by reference.

BACKGROUND OF THE DISCLOSURE

Field of the Disclosure

The present disclosure relates to a method and a system for arranging and manipulating augmented reality content in the 3D space. More particularly, the present disclosure relates to a method and a system for arranging and manipulating pre-created augmented reality content in the 3D space.

Related Art

Recently, with the breakthroughs of image processing technology, Research and Development (R&D) industry related to virtual reality (VR) and augmented reality (AR) technologies is growing, and their application fields are also expanding.

For example, virtual reality and augmented reality technologies are being put into practical use in the fields such as broadcasting, advertisement, exhibition, game, theme park, defense, education, and promotion.

Along with technological development, a number of virtual reality and augmented reality applications based on various computing devices are also being developed.

Also, as various computing devices (for example, mobile devices and/or desktop devices) are in wide use, an environment in which users in related industries may easily access and use virtual and augmented reality applications is being created.

For example, an application provides software tools capable of creating virtual objects in shapes desired by a user in a predetermined virtual space.

However, conventional applications according to the present technical field reveal a difficulty in that users have to create a virtual object in the three-dimensional space using a two-dimensional user interface based on a PC or the like.

For example, the prior art has a limit in that a two-dimensional user interface (for example, a 2D coordinate system interface based on a mouse click or a keyboard input) has to be used even when the position, pose (for example, 6 degrees of freedom pose), or scale of a virtual object needs to be set up in the three-dimensional space. Therefore, when the virtual object is augmented in the 3D space, a predetermined error (for example, a position error, a pose error, and/or a scale error) shows up, or the virtual object is displayed in a distorted shape.

Moreover, users using applications in the present technology field create virtual objects using a library that loads predetermined virtual objects or often access open-source data sets to load and use virtual objects pre-created by other users. The environment built upon the open-source data sets is gradually expanding and evolving.

However, when a user retrieves a predetermined virtual object into a specific 3D space using an open-source data set, it is frequently observed that the virtual object does not match the 3D space accurately and is augmented and displayed in a somewhat unnatural shape.

For example, when a first virtual object created in a user's first virtual space is loaded into a second virtual space of another user, the first virtual object is frequently not displayed adequately such that the first virtual object is loaded at a location out of the second virtual space or overlaps another augmented reality content.

In addition to these problems, users' demands for various additional services using virtual reality and augmented reality technologies are becoming more specific and diversified; thus, the development and introduction of related technologies are necessary.

PRIOR ART REFERENCES

Patents (Patent 1) KR 10-2020-0001237 A

SUMMARY

The present disclosure has been made to solve the problem above and aims to provide a method and a system for arranging and manipulating augmented reality (AR) content in the 3D space capable of arranging and manipulating pre-created AR content in the 3D space.

Technical objects to be achieved by the present disclosure and embodiments according to the present disclosure are not limited to the technical objects described above, and other technical objects may also be addressed.

A method for arranging and manipulating augmented reality (AR) content in the 3D space according to an embodiment of the present disclosure is a method for arranging and manipulating AR content in the 3D space by a creation application executed by at least one or more processors of a mobile terminal, comprising detecting a 3D arrangement space which is a 3D space representing a surrounding environment; displaying AR content on the detected 3D arrangement space; providing an attribute information edit interface through which position information of the displayed AR content is modified according to a user input; modifying position information of the AR content based on a user's gesture input through the provided attribute information edit interface; reconfiguring the modified position information as the position information of the AR content; and storing the reconfigured AR content.

At this time, the position information includes at least one or more pieces of information among the position, pose, and scale information of the AR content.

Also, the modifying position information of the AR content includes obtaining a start gesture input that determines at least one of the position, pose, and scale attribute parameters of the position information as an edit attribute parameter, wherein the edit attribute parameter is an attribute parameter modified based on a user's gesture input through the attribute information edit interface.

Also, the modifying position information of the AR content further includes obtaining an edit gesture input that adjusts a parameter value of the edit attribute parameter and displaying varying AR content in real-time based on the adjusted parameter value.

Also, the reconfiguring modified position information as the position information of the AR content reconfigures the position information of the AR content based on a numeric value of a finally determined parameter.

Also, the reconfiguring modified position information as the position information of the AR content further includes providing the AR content with reconfigured position information, and the providing the reconfigured AR content includes augmenting and displaying the AR content on the 3D arrangement space according to a numeric value of the finally determined parameter.

Also, the reconfiguring modified position information as the position information of the AR content includes determining position information of the AR content with respect to a predetermined reference object.

Also, the determining position information of the AR content with respect to a predetermined reference object include determining the reference object for the AR content, generating augmentation relationship attribute information representing the position information of the AR content with respect to the position information of the determined reference object, and reconfiguring the position information of the AR content based on the generated augmentation relationship attribute information.

Also, the determining position information of the AR content with respect to a predetermined reference object further includes providing the AR content with reconfigured position information, and the providing the reconfigured AR content includes obtaining position information of the AR content, detecting the reference object included in the obtained position information within the 3D arrangement space, and displaying the AR content by augmenting it on the 3D arrangement space according to the augmentation relationship attribute information with respect to the detected reference object.

Meanwhile, a system for arranging and manipulating augmented reality (AR) content in the 3D space according to an embodiment of the present disclosure comprises a display displaying AR content; at least one or more processors; and at least one or more memories, wherein the at least one application, as at least one application arranging and manipulating AR content in the 3D space stored in the memory and executed by the at least one or more processors, detects a 3D arrangement space which is a 3D space representing a surrounding environment; displays AR content on the detected 3D arrangement space; provides an attribute information edit interface through which position information of the displayed AR content is modified according to a user input; modifies position information of the AR content based on a user's gesture input through the provided attribute information edit interface; reconfigures the modified position information as the position information of the AR content; stores the AR content with reconfigured position information; and provides the stored AR content according to the modified position information.

A method and a system for arranging and manipulating augmented reality (AR) content in the 3D space according to an embodiment of the present disclosure allows a user to arrange and manipulate pre-created AR content in the 3D space based on a 3D user interface, thereby enabling the user to arrange and manipulate AR content in the corresponding 3D space more easily and intuitively than when creating AR content using a 2D user interface (for example, 2 2D coordinate system based on a mouse click or a keyboard input).

Also, A method and a system for arranging and manipulating augmented reality (AR) content in the 3D space according to an embodiment of the present disclosure allows a user to arrange and manipulate predetermined AR content in the 3D space based on a 3D user interface and thus enables the user to configure the position of the AR content augmented and displayed on the 3D space more precisely, thereby making the AR content displayed with a more accurate position, pose, and/or scale in the corresponding 3D space.

Also, A method and a system for arranging and manipulating augmented reality (AR) content in the 3D space according to an embodiment of the present disclosure allows a user to arrange and manipulate predetermined AR content in the 3D space based on a 3D user interface, thereby minimizing the problem that a predetermined error (for example, a position error, a pose error, and/or a scale error) shows up or AR content is displayed in a distorted shape when the corresponding AR content is augmented and displayed on the 3D space.

The technical effects of the present disclosure are not limited to the technical effects described above, and other technical effects not mentioned herein may be understood clearly from the description below.

BRIEF DESCRIPTION OF THE DRAWINGS

FIG. 1 illustrates a method and a system for arranging and manipulating AR content in the 3D space according to an embodiment of the present disclosure.

FIG. 2 is a flow diagram illustrating a method for arranging and manipulating AR content in the 3D space according to an embodiment of the present disclosure.

FIG. 3 is an example in which AR content according to an embodiment of the present disclosure is displayed on the 3D arrangement space.

FIG. 4 illustrates an example of a start gesture input according to an embodiment of the present disclosure.

FIG. 5 illustrates an example of an edit gesture input according to an embodiment of the present disclosure.

FIG. 6 are examples illustrating a method for determining position information of AR content according to an embodiment of the present disclosure.

FIGS. 7 and 8 are examples illustrating a method for displaying AR content based on a reference object according to an embodiment of the present disclosure.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present disclosure; and should not be understood to preclude the possibility of adding one or more other features or constituting elements. Also, constituting elements in a figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the disclosure, the same or corresponding constituting element is assigned the same reference number, and repeated descriptions thereof will be omitted.

FIG. 1 illustrates a method and a system for arranging and manipulating AR content in the 3D space according to an embodiment of the present disclosure.

Referring to FIG. 1, a system for arranging and manipulating AR content in the 3D space according to an embodiment of the present disclosure (in what follows, an arrangement and manipulation system) may provide an arrangement and manipulation service through which a user may arrange and manipulate pre-created AR content in the 3D space.

Also, the arrangement and manipulation system according to the embodiment may include an AR content creation computing device 100, a mobile terminal 200, and an AR content provision server 300.

At this time, the AR content creation computing device 100, the mobile terminal 200, and the AR content provision server 300 may be connected to each other through a network.

Here, the network refers to a connection structure that exchanges information between individual nodes such as the AR content creation computing device 100, the mobile terminal 200, and/or the AR content provision server 300. Examples of such a network include a 3rd Generation Partnership Project (3GPP) network, a Long Term Evolution (LTE) network, a World Interoperability for Microwave Access (WIMAX) network, the Internet, a Local Area Network (LAN), a Wireless Local Area Network (Wireless LAN), a Wide Area Network (WAN), a Personal Area Network (PAN), a Bluetooth network, a satellite broadcasting network, an analog broadcasting network, and a Digital Multimedia Broadcasting (DMB) network but are not limited to the examples.

Specifically, the AR content creation computing device 100 according to the embodiment may be a predetermined computing device installed with a creation application implementing a virtual object creation service that may create AR content according to the user's request.

In the embodiment, the AR content creation computing device 100 may include a desktop-type computing device installed with a creation application.

Here, the desktop-type computing device may include a device installed with a program for executing a virtual object creation service based on wired/wireless communication, such as a personal computer like a fixed-type desktop PC, a laptop computer, and an ultrabook installed with a creation application.

Also, the mobile terminal 200 according to the embodiment may be a predetermined computing device installed with an augmentation application providing an arrangement and manipulation service.

In the embodiment, the mobile terminal 200 may include a mobile type computing device and/or a wearable type computing device installed with an augmentation application.

Here, the mobile type computing device may be a mobile device such as a smartphone or a tablet PC installed with an augmentation application.

For example, the mobile type computing device may include a smartphone, a mobile phone, a digital broadcast terminal, a personal digital assistant (PDA), a portable multimedia player (PMP), and a tablet PC.

Also, the wearable type computing device may be a predetermined computing device installed with an augmentation application that implements an arrangement and manipulation service.

Specifically, the wearable-type computing device allows a user to freely perform a computing action while moving or performing an activity by being attached to the user's body or clothes and may further mean an application capable of performing particular computing functions.

Such a wearable device may be implemented based on smart glasses, a smartwatch, and/or a head-mounted display (HMD). However, it would be the most preferred embodiment of the present disclosure in terms of usability if the wearable type computing device is implemented using smart glasses.

Also, the AR content provision server 300 according to the embodiment of the present disclosure may perform a series of processes for providing an arrangement and manipulation service.

Specifically, the AR content provision server 300 according to the embodiment may provide an arrangement and manipulation service by exchanging data required for operating an augmentation application that implements the arrangement and manipulation service in an external device such as the AR content creation computing device 100 and/or the mobile terminal 200 with the external device.

More specifically, the AR content provision server 300 according to the embodiment may provide an environment in which an augmentation application may operate in an external device (the mobile terminal 200 in the embodiment).

To this end, the AR content provision server 300 may include an application program, data, and/or commands for implementing the augmentation application.

Also, the AR content provision server 300 according to the embodiment may store and manage various application programs, applications, commands, and/or data for implementing an arrangement and manipulation service.

The AR content provision server 300 according to the embodiment may store and manage 3D space information, AR content information, position information, user interface information, edit attribute parameter information, gesture category information, reference object information, and/or augmentation relationship attribute information.

In the embodiment of the present disclosure, it is assumed that the AR content provision server 300 provides an environment in which an external device may operate an arrangement and manipulation service and stores and manages various data related to the arrangement and manipulation service. However, depending on the situations, various embodiments may be implemented such that an external device (for example, the mobile terminal 200) may perform at least part of functional operations performed by the AR content provision server 300, or the AR content provision server 300 may further perform at least part of the functional operations performed by the external device.

Also, the arrangement and manipulation system that includes the constituting elements above according to the embodiment of the present disclosure may operate an arrangement and manipulation service in conjunction with a virtual object creation service in a systematic way and also operate an augmentation application in conjunction with a creation application in a systematic manner.

Also, each of the AR content creation computing device 100, the mobile terminal 200, and the AR content provision server 300 as described above in the embodiment may be implemented using a predetermined computing device comprising at least one or more memories storing various application programs, data, and/or commands for providing an arrangement and manipulation service; and at least one or more processors.

Here, the memory may store one or more of an operating system (OS), various application programs, applications, data, and commands for providing an application and manipulation service and/or a virtual object creation service.

Also, the memory may include a program area and a data area.

Here, the program area according to the embodiment may be linked between an operating system (OS) for booting the AR content creation computing device 100, the mobile terminal 200, and/or the AR content provision server 300; and functional elements. The data area may store data generated according to the use of the AR content creation computing device 100, the mobile terminal 200, and/or the AR content provision server 300.

The memory according to the embodiment may be one of various storage devices, such as a ROM, a RAM, an EPROM, a flash drive, and a hard drive, or web storage that performs a storage function of the memory on the Internet.

Also, the memory may be a recording medium detachable from the AR content creation computing device 100, the mobile terminal 200, and/or the AR content provision server 300.

Meanwhile, the processor may control the overall operation of each unit included in the corresponding computing device to implement an arrangement and manipulation service and/or a virtual object creation service.

The processor may be a system-on-a-chip (SOC) suitable for a computing device including a central processing unit (CPU) and/or a graphics processing unit (GPU), execute an operating system (OS) stored in the memory and/or an application program, and control each constituting element installed in the AR content creation computing device 100, the mobile terminal 200, and/or the AR content provision server 300.

Also, the processor may communicate internally with each constituting element through a system bus and may include one or more predetermined bus structures including a local bus.

Also, the processor may be implemented using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and electrical units for performing other functions.

Method for Arranging and Manipulating AR Content in the 3D Space

In what follows, a method for arranging and manipulating AR content in the 3D space by an augmentation application executed by at least one or more processors of the mobile terminal 200 will be described in detail with reference to FIGS. 2 to 8.

Specifically, at least one or more processors of the mobile terminal 200 according to an embodiment of the present disclosure may execute at least one or more augmentation applications stored in at least one or more memories or run the applications in the background.

FIG. 2 is a flow diagram illustrating a method for arranging and manipulating AR content in the 3D space according to an embodiment of the present disclosure.

Referring to FIG. 2, the augmentation application according to the embodiment executed by at least one or more processors of the mobile terminal 200 or run in the background may obtain 3D space information for a surrounding environment S101.

Specifically, the augmentation application according to the embodiment may obtain sensing data from actual 3D space of the user's surrounding environment (or the mobile terminal 200) based on at least one or more sensors (for example, an image sensor and/or a depth sensor).

Also, the augmentation application may obtain the 3D space information for the surrounding environment based on the obtained sensing data.

The augmentation application according to the embodiment may obtain at least one or more images of the surrounding environment based on an image sensor and/or a depth sensor.

And the augmentation application may generate a 3D map built based on a predetermined coordinate system using the information on at least one or more objects within the surrounding environment based on the obtained image.

Also, the augmentation application may obtain the 3D space information on the surrounding environment based on the generated 3D map.

Also, the augmentation application according to the embodiment may obtain AR content to be augmented and displayed on the 3D space (in what follows, 3D arrangement space) representing the surrounding environment based on the obtained 3D space information.

Specifically, the augmentation application according to the embodiment may load and obtain predetermined AR content to be displayed on the 3D arrangement space from among at least one or more pieces of AR content pre-created from a predetermined virtual object library (for example, Poly).

For example, the augmentation application may load and obtain first AR content pre-created and stored on the virtual object library by another user (for example, AR content that displays pressure data of a hydraulic system in real-time graph and/or displays the pressure data as a virtual object) by receiving the first AR content from the virtual object library.

FIG. 3 is an example in which AR content according to an embodiment of the present disclosure is displayed on the 3D arrangement space.

Also, referring to FIG. 3, the augmentation application according to the embodiment may display obtained AR content S105.

In other words, the augmentation application according to the embodiment may augment and display AR content 20 received to be displayed on the 3D arrangement space 10 among at least one or more pieces of pre-created AR content at a predetermined location of the 3D arrangement space.

At this time, the augmentation application may display the AR content 20 on the 3D arrangement space 10 according to whether the AR content 20 to be displayed includes position information.

Here, the position information according to the embodiment may include position, pose (6 degrees of freedom (DoF) and/or viewpoint), and/or scale information of the AR content 20.

Specifically, when the AR content 20 includes position information, the augmentation application according to the embodiment may augment and display the corresponding AR content 20 on the 3D arrangement space 10 according to the position information.

For example, the augmentation application may augment and display first AR content 20 to have a first position, a first pose, and a first scale on the corresponding 3D arrangement space 10 according to the position information of the first AR content 20.

On the other hand, the augmentation application according to the embodiment may augment and display the AR content 20 according to a preconfigured particular position when the AR content 20 does not include position information.

The augmentation application according to the embodiment may augment and display the AR content 20 on the 3D arrangement space 10 based on the default position information having a preconfigured position, pose, and/or scale according to a user setting and/or a built-in process.

For example, the augmentation application may augment the AR content 20 to be displayed on the corresponding 3D arrangement space 10 so that the AR content 20 has the first position, the first pose, and the first scale based on the default position information independently of the individual attributes of the AR content 20.

In the following embodiment, descriptions are given based on the assumption that the AR content 20 is displayed on the 3D arrangement space 10 based on the default position information. However, the present disclosure is not limited to the specific assumption.

Also, the augmentation application according to the embodiment may provide an interface for editing attribute information of the AR content 20 displayed as described above S107.

Here, the attribute information edit interface according to the embodiment may be a user interface through which a user may edit the position information of the AR content 20, namely the position, pose, and/or scale information of the AR content 20, on the 3D arrangement space 10.

FIG. 4 illustrates an example of a start gesture input according to an embodiment of the present disclosure.

Specifically, referring to FIG. 4, the augmentation application according to the embodiment may obtain a start gesture input 30 that determines an edit attribute parameter which is an attribute parameter to be modified based on 1) attribute information edit interface.

More specifically, the augmentation application according to the embodiment may detect the start gesture input 30 that determines whether to start a process for editing a particular attribute parameter value based on a user's gesture through the attribute information edit interface among at least one or more attribute parameters (in the embodiment, a position attribute parameter, a pose attribute parameter, and/or a scale attribute parameter) included in the position information of the AR content 20.

Also, the augmented application according to the embodiment may determine the edit attribute parameter based on the detected start gesture.

Specifically, the augmented application according to the embodiment may detect a predetermined start gesture matching the user's gesture input detected through the attribute information edit interface based on a preconfigured start gesture category.

For example, the augmentation application may detect a predetermined start gesture (for example, a first gesture) matching the user's gesture input detected through the attribute information edit interface based on a start gesture category preconfigured by including the first gesture (for example, a drag gesture) performing a process for editing a position attribute parameter, a second gesture (for example, a rotate gesture) performing a process for editing a pose attribute parameter, and a third gesture (for example, a pinch in/out gesture) performing a process for editing a scale attribute parameter.

And the augmentation application may detect an attribute parameter corresponding to the detected start gesture.

For example, when the detected start gesture is the first gesture, the augmented application may detect the position attribute parameter, which is an attribute parameter corresponding to the first gesture.

Also, the augmented application according to the embodiment may set the attribute parameter corresponding to the detected start gesture as an edit attribute parameter.

Also, the augmentation application may execute a process for editing a configured edit attribute parameter (namely, a process for editing the value of the corresponding edit attribute parameter).

For example, when the user's gesture input detected through the attribute information edit interface (for example, a gesture of pointing a finger to a specific point) is the preconfigured first start gesture that starts a process for editing the position attribute parameter, the augmented application may detect the position attribute parameter, which is an attribute parameter corresponding to the first start gesture.

And the augmented application in an example may configure the detected position attribute parameter as an edit attribute parameter.

Also, the augmentation application in the example may execute a process for editing the configured position attribute parameter.

In another example, when the user's gesture input (for example, flipping the palm) detected through the attribute information edit interface is a preconfigured second start gesture that starts a process for editing the pose attribute parameter, the augmentation application may detect the pose attribute parameter, which is an attribute parameter corresponding to the second start gesture, set the detected pose attribute parameter as an edit attribute parameter, and perform a process for editing the configured pose attribute parameter.

In yet another example, when the user's gesture input detected through the attribute information edit interface (for example, a gesture of closing and opening a hand) is a preconfigured third gesture that starts a process for editing the scale attribute parameter, the augmentation application may detect the scale attribute parameter, which is an attribute parameter corresponding to the third start gesture, set the detected scale attribute parameter as an edit attribute parameter, and perform a process for editing the scale attribute parameter.

FIG. 5 illustrates an example of an edit gesture input according to an embodiment of the present disclosure.

Also, referring to FIG. 5, when a process for editing a predetermined edit attribute parameter is performed based on the start gesture input 30, the augmentation application according to the embodiment may obtain an 2) edit gesture input 40 that adjusts the edit attribute parameter value based on the attribute information edit interface.

Also, the augmented application according to the embodiment may change the edit attribute parameter value determined for the corresponding AR content 20 based on the edit gesture input 40 obtained as described above.

In other words, the augmented application may change the value of an attribute parameter (edit attribute parameter) selected for edition among at least one or more attribute parameters (the position, pose, and/or scale parameter within the position information according to the embodiment)

included in the AR content 20 based on the user's edit gesture input 40 through the attribute information edit interface.

In other words, based on the user input through the attribute information edit interface, the augmented application may detect the edit gesture input 40 that performs changing of the determined edit attribute parameter value and change one attribute parameter value of the AR content 20 by adjusting the edit attribute parameter value based on the detected edit gesture input 40.

For example, after the edit attribute parameter for the AR content 20 is determined as the position attribute parameter, the augmentation application may obtain a predetermined edit gesture input (for example, drag gesture input) that performs changing of the position attribute parameter value through the attribute information edit interface.

Also, the augmentation application in an example may change the position information (namely, the position attribute parameter value) of the AR content 20 based on the edit gesture input 40 obtained as described above.

In another example, after the edit attribute parameter for the AR content 20 is determined as the pose or scale attribute parameter, the augmentation application may obtain a predetermined edit gesture that performs changing of the pose or scale attribute parameter value (for example, a drag gesture input, a tilting gesture input, a pointing gesture input, a rotation gesture input, and/or a scaling gesture input) through the attribute information edit interface.

And the augmentation application in the example may change the pose or scale information (namely, the pose or scale attribute parameter value) of the AR content 20 based on the obtained edit gesture input 40.

Also, the augmentation application according to the embodiment may display the AR content 20 considering the change of the 3) edit attribute parameter value.

Specifically, the augmentation application according to the embodiment may display the AR content 20 changing according to the user's edit gesture input 40 in real-time.

In other words, the augmentation application according to the embodiment may provide the AR content 20 augmented and displayed through real-time interaction with the edit attribute parameter value changing based on the edit gesture input 40.

For example, when the edit attribute parameter is the position attribute parameter, and the position of the AR content 20 changes in real-time according to the edit gesture input 40 (for example, a drag gesture), the augmentation application may provide the AR content 20 changing its position in real-time by displaying the AR content 20 on the 3D arrangement space 10.

As described above, the augmentation application enables a user to arrange and adjust the AR content 20 using a user interface that allows the user to perform 3D manipulation of the AR content 20 in the 3D space (in the embodiment, the 3D arrangement space 10) to augment the AR content 20. By doing so, the augmentation application enables the user to create the AR content 20 more easily and intuitively than when creating the AR content 20 based on a 2D interface in a space (for example, a virtual object creation space provided based on a software tool installed in the AR content 20 creation computing device 100) different from the 3D space in which the AR content 20 is to be arranged. Also, the augmentation application may improve the accuracy of the position of the created AR content 20 in the 3D space.

Also, the augmentation application according to the embodiment may determine position information of the AR content 20 displayed on the 3D arrangement space 10 S109.

FIG. 6 are examples illustrating a method for determining position information of AR content according to an embodiment of the present disclosure.

Specifically, referring to FIG. 6(*a*), the augmentation application according to the embodiment may confirm, based on a user interface (for example, the attribute information edit interface) the position information of the AR content 20 based on the attribute parameter value at the time a user input (for example, a user input that clicks a confirmation button for the attribute parameter value) that confirms the attribute parameter value of the AR content 20 or the last edit gesture input 40 is detected.

In other words, the augmentation application according to the embodiment may confirm the position information of the AR content 20, of which at least one or more attributes among position, pose, and/or scale have been changed, based on the attribute parameter values at the aforementioned time through the attribute information edit interface.

At this time, the augmentation application according to the embodiment may determine the position information of the AR content 20 based on the corresponding attribute parameter values 51 (for example, absolute values in the embodiment).

For example, the augmentation application may determine the coordinate value represented by the position attribute parameter of the first AR content 20 as the position information of the first AR content 20. Similarly, the augmentation application may determine a value represented by the pose and/or scale attribute parameter of the first AR content 20 as the pose and/or scale information of the first AR content 20.

Meanwhile, referring to FIG. 6(*b*), the augmentation application according to another embodiment may determine the position information of the AR content 20 based on a predetermined reference object 60.

Specifically, the augmentation application according to the present embodiment may set a reference object 60 for the AR content 20 for which modification of the 1) attribute parameter value has been completed.

More specifically, the augmentation application according to the embodiment may provide a reference object 60 setting interface capable of setting a reference object 60 for the AR content 20.

Also, the augmented application may determine the reference object 60 for the AR content 20 based on a user input through the provided reference object 60 setting interface.

In another embodiment, the augmented application may automatically set the reference object 60 for the AR content 20 according to a predetermined criterion based on a preconfigured, built-in process.

For example, the augmented application may set an object closest to the AR content 20 as the reference object 60 for the AR content 20.

Alternatively, the augmentation application according to another example may detect an object associated with the AR content among a plurality of objects within the corresponding 3D arrangement space 10 and set the detected object as the reference object 60.

For example, when the AR content 20 displays pressure data of a hydraulic system as a real-time graph and/or a virtual object, the augmentation application may detect a hydraulic target object (for example, first equipment), which is a target object on which the hydraulic system performs pressure measurements among a plurality of objects within the corresponding 3D arrangement space 10, as an object associated with the AR content 20.

And the augmentation application in the example may set the hydraulic target object detected as described above as a reference object 60 for the AR content 20.

Also, the augmentation application according to the present embodiment may determine the position information of the AR content 20 based on the position information of the 2) set reference object 60.

Specifically, the augmentation application may generate augmentation relationship attribute information 52, which is the information that has determined the position, pose, and/or scale information (namely, the position information of the AR content 20) of the AR content 20, based on the position information that includes the position, pose, and/or scale information for the reference object 60 set as above.

In other words, the augmentation application according to the present embodiment may augment and display the AR content 20 on the 3D arrangement space 10 by determining the position, pose, and/or scale of the AR content 20 based on the position, pose, and scale of the reference object 60 by referring to the augmentation relationship attribute information 52 generated as described above.

Here, the augmentation relationship attribute information 52 according to the embodiment may include position relationship parameter information representing the position information of the AR content based on the position information of the reference object 60, pose relationship parameter information representing the pose information of the AR content 20 based on the pose information of the reference object 60, and/or scale relationship parameter information representing scale information of the AR content 20 based on the scale information of the reference object 60.

Specifically, the augmentation application according to the present embodiment may generate position relationship parameter information for the AR content 20 based on the relative position information of the AR content by referring to the position information of the reference object 60.

For example, the augmentation application may calculate the position relationship parameter information for the AR content 20 based on the relative association relationship between the coordinates of the center point of the reference object 60 and the coordinates of the center point of the AR content 20.

Also, the augmentation application according to the present embodiment may generate pose relationship parameter information representing the relative pose of the AR content 20 with respect to the reference object 60 based on the relative pose information of the AR content 20 with respect to the pose information of the reference object 60.

For example, the augmentation application may generate pose relationship parameter information by calculating a difference between the 6 DoF pose of the reference object 60 and the 6 DoF pose of the AR content 20.

Also, the augmentation application according to the present embodiment may generate scale relationship parameter information for the AR content 20 based on the relative scale information of the AR content 20 with respect to the scale information of the reference object 60.

For example, the augmentation application may calculate the scale information based on the maximum values of the reference object 60 in the horizontal and vertical directions and the relative association relationship between the maximum value of the AR content 20 in the horizontal direction and the maximum value thereof in the vertical direction, by which it is possible to obtain the scale relationship parameter information for the AR content 20.

As described above, the augmentation application may determine the posture (position, pose, and/or scale) that should be set to the AR content 20 in the corresponding 3D arrangement space 10 based on a more optimized, customized criterion by letting the position of the AR content 20 be determined based on the position of the reference object 60, through which reliability of the position information of the AR content 20 augmented on the 3D arrangement space 10 may be improved, and mutually associated objects (here, the reference object 60 and the AR content 20 matched to the reference object) on the 3D arrangement space 10 may be managed and displayed by being linked to each other.

Also, the augmentation application according to the embodiment may store the AR content 20 of which the position information has been determined as described above S111.

In other words, the augmentation application according to the embodiment may match and store the AR content 20 for which the position information has been determined and the position information corresponding to the AR content 20.

At this time, the augmentation application according to the embodiment may store the AR content 20 that includes the position information in any of at least one or more memories (for example, a memory of the mobile terminal 200 and/or a memory of the AR content 20 provision server 300) of the arrangement and manipulation system and manage the AR content 20 therein. However, it may be a preferred embodiment to store the AR content 20 that includes the position information on the memory of the AR content 20 provision server 300 capable of implementing a more reliable database.

Also, the augmentation application according to the embodiment may provide an augmented display of the stored AR content 20 S113.

Specifically, the augmentation application according to the embodiment may obtain the AR content 20 that includes the position information.

More specifically, the augmentation application may obtain the AR content 20 from a predetermined memory (for example, a memory of the AR content 20 provision server 300 or a memory of the mobile terminal 200) that stores the corresponding AR content 20 for which the position information has been determined.

Also, the augmentation application according to the embodiment may display based on the position information matching the obtained AR content 20.

Specifically, the augmentation application may augment and display the obtained AR content 20 on the corresponding 3D arrangement space 10 based on the position information matching the AR content 20.

At this time, when the position information matching the corresponding AR content 20 is determined based on the absolute value 51 of the attribute parameter values of the AR content 20, the augmentation application according to the embodiment may augment and display the AR content 20 based on the absolute value 51 (for example, the position coordinates of the AR content 20) of the attribute parameter values.

In another embodiment, when the position information matching the corresponding AR content 20 is determined using the augmentation relationship attribute information 52 based on the association relationship with a predetermined reference object 60, the augmentation application may augment and display the AR content 20 on the 3D arrangement space 10 based on the augmentation relationship attribute information 52.

Specifically, the augmentation application according to the present embodiment may detect the reference object 60, used as a reference when generating the augmentation relationship attribute information 52 of the AR content 20, from among at least one or more objects within the corresponding arrangement space 10.

Also, the augmentation application according to the present embodiment may augment and display the AR content 20 using the augmentation relationship attribute information 52 based on the detected reference object 60.

In other words, the augmentation application may augment and display the AR content 20 in a predetermined area of the corresponding 3D arrangement space 10 by applying the augmentation relationship attribute information 52 based on the position information of the detected reference object 60.

For example, when the AR content 20 to be displayed is AR content 20 that displays pressure data of a hydraulic system as a real-time graph and/or a virtual object, and the reference object 60 used as a reference for generating the augmentation relationship attribute information 52 for the AR content 20 is a hydraulic target object, the augmentation application may detect the hydraulic target object among a plurality of objects within the 3D arrangement space 10 in which the AR content 20 is to be displayed.

And the augmentation application in the example may augment and display the AR content 20 to have a shape at a position corresponding to the predetermined area within the 3D arrangement space 10 by applying the augmentation relationship attribute information 52 based on the position information of the detected hydraulic target object.

As described above, the augmentation application may provide a display of an association relationship between the AR content 20 and the reference object 60 and an arrangement state due to the association relationship easily and clearly by augmenting the corresponding AR content 20 to have a relative position with respect to the predetermined reference object 60.

Also, through the operation above, the augmented application may clearly indicate that predetermined AR content corresponds to the AR content (for example, AR content representing a sensor value of the specific device and/or equipment) of a specific object (for example, a specific device and/or specific equipment) no matter what orientation, position, or viewpoint the corresponding AR content is at in the 3D arrangement space 10.

FIGS. 7 and 8 are examples illustrating a method for displaying AR content based on a reference object according to an embodiment of the present disclosure.

At this time, referring to FIG. 7, when the position of the reference object 60 changes, the augmented application according to the embodiment may change the position of the AR content 20 in response to the changed position of the reference object 60 and augment and display the AR content 20 according to its changed position.

For example, when the pose information of a hydraulic target object (reference object 60) changes (for example, the object rotates by a predetermined angle), the augmentation application may change the pose information of the AR content 20 that displays the pressure data of the hydraulic system as a real-time graph and/or a virtual object in response to the pose change of the hydraulic target object and display the AR content 20 according to the changed pose information (namely, the AR content 20 is displayed by being rotated as much as the predetermined angle).

In other words, the augmentation application may provide a display of AR content 20 by flexibly adapting to the position change of the reference object 60.

Through the operation above, when the position of the reference object 60 changes according to the change of the user's viewpoint or position at which the user sees a reference object 60, the augmentation application may display the AR content 20 matching the reference object 60 by considering the corresponding position change, thereby minimizing a problem that the corresponding AR content 20 is augmented on the 3D arrangement space 10 unnaturally.

Also, referring to FIG. 8, when the position of the reference object 60 changes, the augmentation application according to the embodiment may augment and display the AR content 20 regardless of the position change of the reference object 60.

In other words, even if the posture (position, pose, and/or scale) of the reference object 60 changes, the position of the AR content 20 displayed with respect to the reference object 60 may be maintained at its first augmentation state.

For example, even when the pose information of a hydraulic target object (reference object 60) changes (for example, the object rotates by a predetermined angle), the augmentation application may display the AR content 20 in such a way that the pose of the AR content 20 (here, the AR content 20 that displays the pressure data of the hydraulic system as a real-time graph and/or a virtual object) displayed with respect to the hydraulic target object is still maintained at its first augmentation state.

As described above, the augmentation application maintains the position of the AR content 20 regardless of the position change of the reference object 60, thereby preventing the appearance of the AR content 20 that a user wants to check from being distorted or changed even when the user's viewpoint or position at which the user sees the reference object 60 is changed.

As described above, a method and a system for arranging and manipulating augmented reality (AR) content in the 3D space according to an embodiment of the present disclosure allows a user to arrange and manipulate pre-created AR content in the 3D space based on a 3D user interface, thereby enabling the user to arrange and manipulate AR content in the corresponding 3D space more easily and intuitively than when creating AR content using a 2D user interface (for example, 2 2D coordinate system based on a mouse click or a keyboard input).

Also, A method and a system for arranging and manipulating augmented reality (AR) content in the 3D space according to an embodiment of the present disclosure allows a user to arrange and manipulate predetermined AR content in the 3D space based on a 3D user interface and thus enables the user to configure the position of the AR content augmented and displayed on the 3D space more precisely, thereby making the AR content displayed with a more accurate position, pose, and/or scale in the corresponding 3D space.

Also, A method and a system for arranging and manipulating augmented reality (AR) content in the 3D space according to an embodiment of the present disclosure allows a user to arrange and manipulate predetermined AR content in the 3D space based on a 3D user interface, thereby minimizing the problem that a predetermined error (for example, a position error, a pose error, and/or a scale error) shows up or AR content is displayed in a distorted shape when the corresponding AR content is augmented and displayed on the 3D space.

Also, the embodiments of the present disclosure described above may be implemented in the form of program commands which may be executed through various types of computer constituting elements and recorded in a computer-readable recording medium. The computer-readable recording medium may include program commands, data files, and data structures separately or in combination thereof. The program commands recorded in the medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be replaced with one or more software modules to perform the processes of the present disclosure, and vice versa.

Specific implementation of the present disclosure are embodiments, which does not limit the technical scope of the present disclosure in any way. For the clarity of the disclosure, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of the present disclosure but has to be defined by the appended claims.

What is claimed is:

1. A method for arranging and manipulating augmented reality (AR) content in the 3D space by a creation application executed by at least one or more processors of a mobile terminal, the method comprising:
   detecting a 3D arrangement space which is a 3D space representing a surrounding environment;
   displaying AR content on the detected 3D arrangement space;
   providing an attribute information edit interface through which position information of the displayed AR content is modified according to a user input;
   modifying position information of the AR content based on a user's gesture input through the provided attribute information edit interface;
   reconfiguring the modified position information as the position information of the AR content; and
   storing the reconfigured AR content,
   wherein the position information includes at least one or more pieces of information among the position, pose, and scale information of the AR content,
   wherein the modifying position information of the AR content includes obtaining a start gesture input that determines at least one of the position, pose, and scale attribute parameters of the position information as an edit attribute parameter,
   wherein the edit attribute parameter is an attribute parameter modified based on the user's gesture input through the attribute information edit interface,
   wherein the modifying position information of the AR content further includes obtaining an edit gesture input that adjusts a parameter value of the edit attribute parameter and displaying varying AR content in real-time based on the adjusted parameter value,
   wherein the displaying AR content on the detected 3D arrangement space includes determining AR content for which to configure the position information from a virtual object library; when the determined AR content includes position information, determining position of AR content within the 3D arrangement space based on the position information; augmenting and displaying the AR content at the determined position; and when the determined AR content does not include position information, augmenting and displaying the AR content at a default position of the 3D arrangement space,
   wherein the reconfiguring the modified position information as the position information of the AR content includes changing position information of the AR content based on a numeric value of a finally determined parameter through the attribute information edit interface; determining a reference object for the AR content; generating augmentation relationship attribute information representing a relative association relationship of changed position information of the AR content with respect to the position information of the determined reference object; and reconfiguring position information of the AR content based on the generated association relationship attribute information,
   wherein the storing reconfigured AR content includes storing reconfigured position information of the AR content in the 3D arrangement space in the virtual object library,
   wherein the reconfiguring modified position information as the position information of the AR content further includes providing the AR content with reconfigured position information,
   wherein the providing reconfigured AR content further includes obtaining reconfigured position information of the AR content; detecting the reference object included in the reconfigured position information within the 3D arrangement space; augmenting and displaying the AR content on the 3D arrangement space according to the augmentation relationship attribute information with respect to the detected reference object; and augmenting the AR content by changing the position of the AR content according to the position change of the reference object.

2. The method of claim 1, wherein the providing reconfigured AR content includes augmenting and displaying the AR content on the 3D arrangement space according to a numeric value of the finally determined parameter.

3. A system for arranging and manipulating augmented reality (AR) content in the 3D space, the system comprising:
   a display displaying AR content;
   at least one or more processors; and
   at least one or more memories,
   wherein at least one application, as at least one application arranging and manipulating AR content in the 3D space stored in the memory and executed by the at least one or more processors, detects a 3D arrangement space which is a 3D space representing a surrounding environment;
displays AR content on the detected 3D arrangement space;
provides an attribute information edit interface through which position information of the displayed AR content is modified according to a user input;
modifies position information of the AR content based on a user's gesture input through the provided attribute information edit interface;
reconfigures the modified position information as the position information of the AR content;
stores the AR content with reconfigured position information; and
provides the stored AR content according to the modified position information,
wherein the position information includes at least one or more pieces of information among the position, pose, and scale information of the AR content,
wherein the at least one application obtains a start gesture input that determines at least one of the position, pose, and scale attribute parameters of the position information as an edit attribute parameter,
wherein the edit attribute parameter is an attribute parameter modified based on the user's gesture input through the attribute information edit interface,
wherein the at least one application obtains an edit gesture input that adjusts a parameter value of the edit attribute parameter and displays varying AR content in real-time based on the adjusted parameter value,
wherein the at least one application determines AR content for which to configure the position information from a virtual object library of the memory; when the determined AR content includes position information, determines position of AR content within the 3D arrangement space based on the position information; augments and displays the AR content at the determined position; and when the determined AR content does not include position information, augments and displays the AR content at a default position of the 3D arrangement space,
wherein the at least one application changes position information of the AR content based on a numeric value of a finally determined parameter through the attribute information edit interface; determines a reference object for the AR content; generates augmentation relationship attribute information representing a relative association relationship of changed position information of the AR content with respect to the position information of the determined reference object; reconfigures position information of the AR content based on the generated association relationship attribute information; and stores reconfigured position information of the AR content in the 3D arrangement space in the virtual object library,
wherein the at least one application provides the AR content with reconfigured position information; obtains reconfigured position information of the AR content; detects the reference object included in the reconfigured position information within the 3D arrangement space; augments and displays the AR content on the 3D arrangement space according to the augmentation relationship attribute information with respect to the detected reference object; and augments the AR content by changing the position of the AR content according to the position change of the reference object.

* * * * *